United States Patent [19]

Clarey

[11] 4,395,170

[45] Jul. 26, 1983

[54] DRILL, DRILL CHUCK, AND METHODS OF CHUCKING AND UNCHUCKING

[75] Inventor: Michael E. Clarey, Easley, S.C.

[73] Assignee: The Singer Company, Stamford, Conn.

[21] Appl. No.: 179,359

[22] Filed: Aug. 18, 1980

[51] Int. Cl.³ .................... B25B 13/44; B23B 31/06
[52] U.S. Cl. ................. 408/241 R; 279/1 K; 279/62; 81/90 A
[58] Field of Search ...................... 279/62, 1 K, 60, 61, 279/1 B, 63, 64, 65, 37, 50, 57; 81/90 A; 192/156 R; 408/241 R

[56] References Cited

U.S. PATENT DOCUMENTS

| 833,351 | 7/1905 | Townsend | 279/62 |
|---|---|---|---|
| 1,985,242 | 12/1934 | De Back | 192/56 R |
| 2,684,856 | 3/1950 | Stoner | 279/61 |
| 2,716,555 | 6/1953 | Rowe | 279/36 |
| 3,506,277 | 4/1970 | Harms | 279/1 R |
| 3,552,758 | 1/1971 | Siegler | 279/75 |
| 3,934,891 | 1/1976 | Derbyshire | 279/62 |
| 4,067,424 | 1/1978 | Johnson | 192/56 R |
| 4,260,169 | 4/1981 | Hall | 279/62 |
| 4,277,074 | 7/1981 | Kilberis | 279/62 |
| 4,317,578 | 3/1982 | Welch | 279/62 |
| 4,323,324 | 4/1982 | Eberhardt | 279/62 |

FOREIGN PATENT DOCUMENTS 191959 1/1923 United Kingdom ................. 279/65

Primary Examiner—Robert E. Garrett
Assistant Examiner—Jerry Kearns
Attorney, Agent, or Firm—Edward P. Schmidt; Robert E. Smith; Edward L. Bell

[57] ABSTRACT

A portable electric drill is provided with a keyless slidable jaw chuck having three slidable jaws provided with externally extending teeth mounted within a chuck body having three slideways for the chuck jaws and a traverse nut rotatable on the chuck body having internal threads engaged with the chuck jaws, and a locking shell slidable relative to the traverse nut so as to rotate together relative the chuck body. Teeth, lugs or other projections on the rearward annular face of the shell selectively matingly cooperate with teeth, lugs or similar projections provided on the drill housing so that, when the shell is slid rearwardly towards the drill housing the shell and traverse nut are held against rotation relative the drill housing upon actuation of the drill torotate the chuck body, the chuck jaws will be automatically extended or retracted, depending upon the drill rotation direction, to chuck or unchuck a drill bit or other accessory inserted therebetween.

3 Claims, 6 Drawing Figures

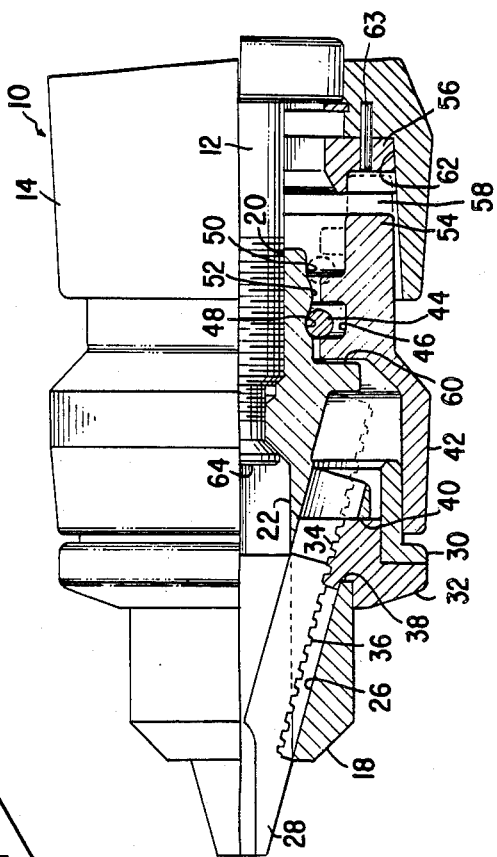
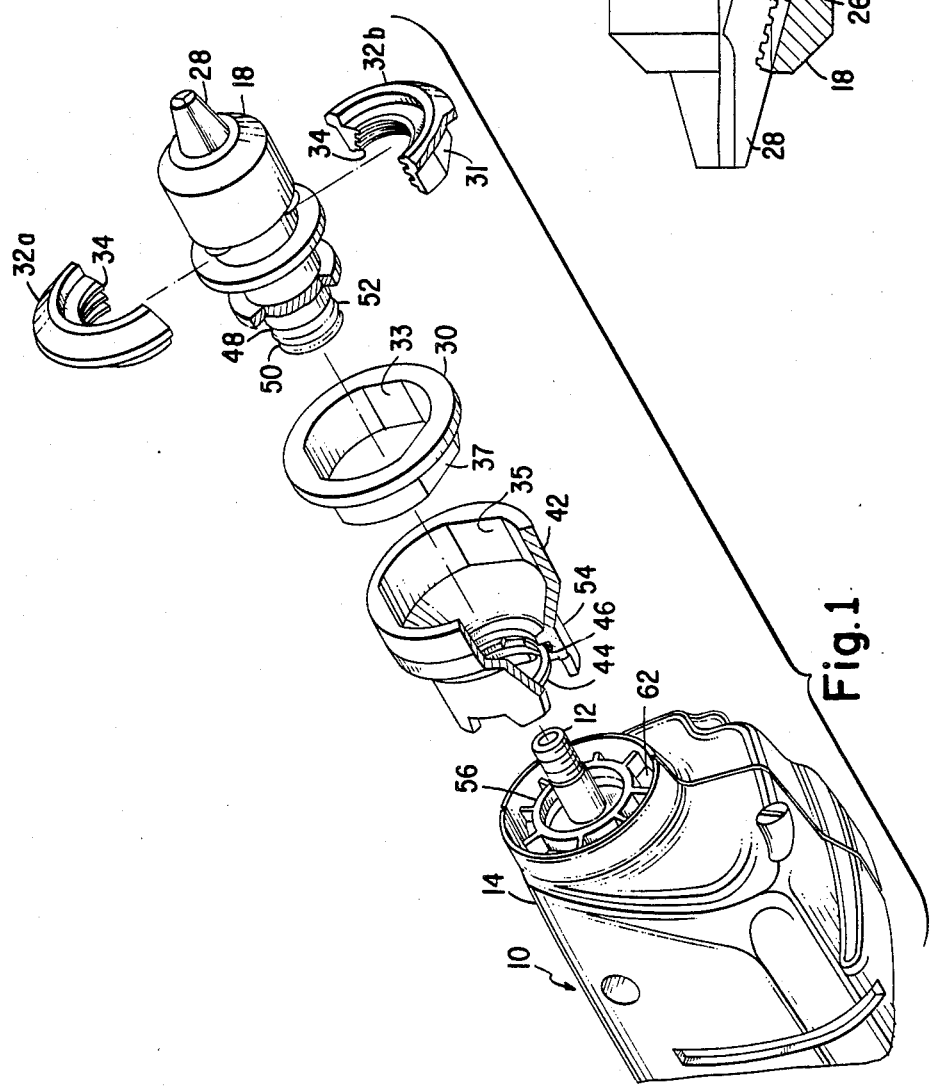

DRILL, DRILL CHUCK, AND METHODS OF CHUCKING AND UNCHUCKING

DESCRIPTION

Field of the Invention

This invention relates to drills and, especially, power operated drills and to keyless sliding jaw drill chucks and methods of chucking and unchucking thereof.

BACKGROUND OF THE INVENTION

Rowe U.S. Pat. No. 2,716,555 discloses a locking arrangement for a drill chuck wherein a locking lug is slidable laterally into and out of engagement with the drill chuck nut to enable motor torque to be utilized to open and close the chuck jaws. Haviland U.S. Pat. No. 3,545,776 and McCarthy et al, U.S. Pat. No. 3,325,166 disclose the use of a sliding collar carried by a drill chuck spindle, spring biased towards the front of the chuck away from the drill, and provided with lugs on their rear surfaces for engaging mating lugs on the drill housing. In these latter two patents, however, the sliding collar is keyed to and utilized to lock the spindle against rotation so that the locking collar may be easily manually rotated to actuate the sliding chuck jaws. Other keyless chucks for powered drills, especially for portable electric drills, have been previously suggested but have not found widespread acceptance. Rather, keyed chucks have been more popular, even though the need for a key has been found disadvantageous.

OBJECTS OF THE INVENTION

Bearing in mind the foregoing, it is a primary object of the present invention to provide new and improved keyless chucks, powered drills incorporating the same, and methods of chucking and unchucking the same.

Another primary object of the present invention, in addition to the foregoing object, is the provision of novel and improved keyless chucks, drills incorporating such chucks, and methods of chucking and unchucking thereof utilizing the powered torque of such drills for the automatic chucking and unchucking of drill bits and other accessories therefore.

Another primary object of the present invention, in addition to each of the foregoing objects, is the provision of novel and improved keyless chucks, powered drills incorporating the same, and methods of chucking and unchucking utilizing the powered torque of the drill for operating the chucking mechanism to slide a plurality of jaws toward and away from each other together with means for automatically releasing such torquing power therefrom at a torque level protecting the drill, chuck and drill bit inserted therein from damage due to excessive torquing.

Yet another primary object of the present invention, in addition to each of the foregoing objects, is the provision of such drills and drill chucks powered thereby for chucking and unchucking drill bits and other accessories which are compact, safe, reliable and convenient in use, durable, and economical to manufacture.

Still another primary object of the present invention, in addition to each of the foregoing objects, is the provision of such drills, drill chucks, and methods of chucking and unchucking of keyless slidable jaw chucks having a slidable shell mounted for rotation with a traverse nut for advancing and retracting a plurality of sliding externally toothed jaws and having means selectively engagable with the drill housing for locking thereby against rotation relative thereto so that powered operation of the drill when the slidable shell is engaged therewith rotates the chuck body and jaws relative said locked slidable shell for chucking and unchucking operation thereof.

Yet another primary object of the present invention, in addition to each of the foregoing objects, is the provision of such drills, drill chucks, and methods of chucking and unchucking thereof wherein said sliding shell comprises at least one and preferably a plurality of lugs or teeth extending around an annular end thereof adjacent the drill housing and wherein at least one and preferably a plurality of mating lugs or teeth are provided on the drill housing adjacent thereto.

Still another primary object of the present invention, in addition to each of the foregoing objects, is the provision of such drills, drill chucks, and methods of chucking and unchucking thereof wherein said lugs or teeth are angulated to provide a vector force during torquing which acts in a direction forwardly of the chuck tending to release said lugs or teeth of said sliding shell from the toothed engagement.

Another and yet still further primary object of the present invention, in addition to each of the foregoing objects, is the provision of such drills, drill chucks, and methods of chucking and unchucking drill bits and other accessories including spring means for retaining such sliding shell in its forward, released or unlocked position to enable normal operative rotation of said chuck while requiring positive operator applied rearward pressure thereon for engaging said locking means.

Another and still further primary object of the present invention, in addition to each of the foregoing objects, is the provision of such drills, drill chucks, and methods of chucking and unchucking wherein said chuck is provided with a spring detent for selectively holding said shell in either a forward position wherein said teeth are disengaged for drilling, or the like, and in a rearward position wherein said teeth are engaged for chucking and unchucking so that the inclination of said teeth pops said detent from said rear position to said forward position at a predetermined torque.

Yet still another and yet further primary object of the present invention, in addition to each of the foregoing objects, is the provision of such drill, drill chucks, and methods of chucking and unchucking wherein said shell is spring biased towards the forward configuration wherein said teeth are disengaged.

A yet further primary object of the present invention, in addition to each of the foregoing objects, is the provision of such drills, drill chucks, and methods of chucking and unchucking wherein there is provided a collar between said shell and said traverse nut for retaining said traverse nut in a circular configuration, said traverse nut being split for assembly therewith.

A yet still further primary object of the present invention, in addition to each of the foregoing objects, is the provision of such drills, drill chucks, and methods of chucking and unchucking wherein said shell, said collar and said traverse nut are provided with mating flatted surfaces to prevent relative rotation therebetween.

Yet still another primary object of the present invention, in addition to each of the foregoing objects, is the provision of such drills and drill chucks wherein said sleeve is of sheet steel formed with a plurality of longitudinal protuberances extending outwardly to mate with longitudinal grooves on the inside of said shell.

The invention resides in the combination, construction, arrangement and disposition for the various component parts and elements incorporated in new and improved drills, drill chucks, and methods of chucking and unchucking in accordance with the principles of this invention. The present invention will be better understood and objects and important features other than those specifically enumerated above, will become apparent when consideration is given to the following details and description which, when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

BRIEF SUMMARY OF THE INVENTION

In accordance with the present invention, a power operated drill, such as a portable electric drill, is provided with a keyless slidable jaw chuck, for example, a chuck having three slidable jaws provided with externally extending teeth mounted within a chuck body having three slideways for the chuck jaws and further comprising a traverse nut rotatable on the chuck body having internal threads engaged with the chuck jaws, and a locking shell slidable relative to the traverse nut. The nut and the shell are provided with means restraining them so as to rotate together relative the chuck body. Teeth, lugs or other projections are provided on the rearward annular face of the shell for selective mating cooperation with teeth, lugs or similar projections provided on the drill housing so that, when the shell is slid rearwardly towards the drill housing so that the teeth, lugs or other projections engage, the shell and traverse nut are held against rotation relative the drill housing. In this configuration, upon actuation of the drill to rotate the chuck body, the chuck jaws will be automatically extended or retracted, depending upon the drill rotation direction, to chuck or unchuck a drill bit or other accessory inserted therebetween. In accordance with a preferred embodiment, a plurality of mating teeth are provided on the rear of the shell and the adjacent portion of the drill housing and the teeth are inclined so as to automatically disengage upon the torque reaching a predefined level to prevent damage to the drill, chuck, or drill bit. In combination with a reversible drill, automatic chucking and unchucking is achieved. The chuck shell is also preferably provided with spring means for normally holding it with the teeth disengaged such as a spring biasing it towards disengagement of the teeth or other projections or a two position detent arrangement can be provided which will automatically pop from the chucking and unchucking or locked, rearward position to a forward, disengaged or operating position with the teeth or other projections disengaged.

BRIEF DESCRIPTION OF THE DRAWING

Although the specification concludes with claims particularly pointing out and distinctly claiming the subject matter regarded as forming the present invention, it is believed that the invention will be better understood and objects and important features other than those specifically enumerated above will become apparent from the hereinafter set forth detailed description of the invention taken in conjunction with the annexed drawing, and wherein like reference numerals are utilized for similar parts throughout the various views, in which:

FIG. 1 is an exploded perspective illustration of a drill provided with a drill chuck in accordance with the present invention;

FIG. 2 is an enlarged cross-sectional illustration of the front portion of the drill and drill chuck of FIG. 1 showing the drill chuck in an unlocked position for normal operation of a drill bit or other attachment;

DETAILED DESCRIPTION OF THE INVENTION

Figure 3:
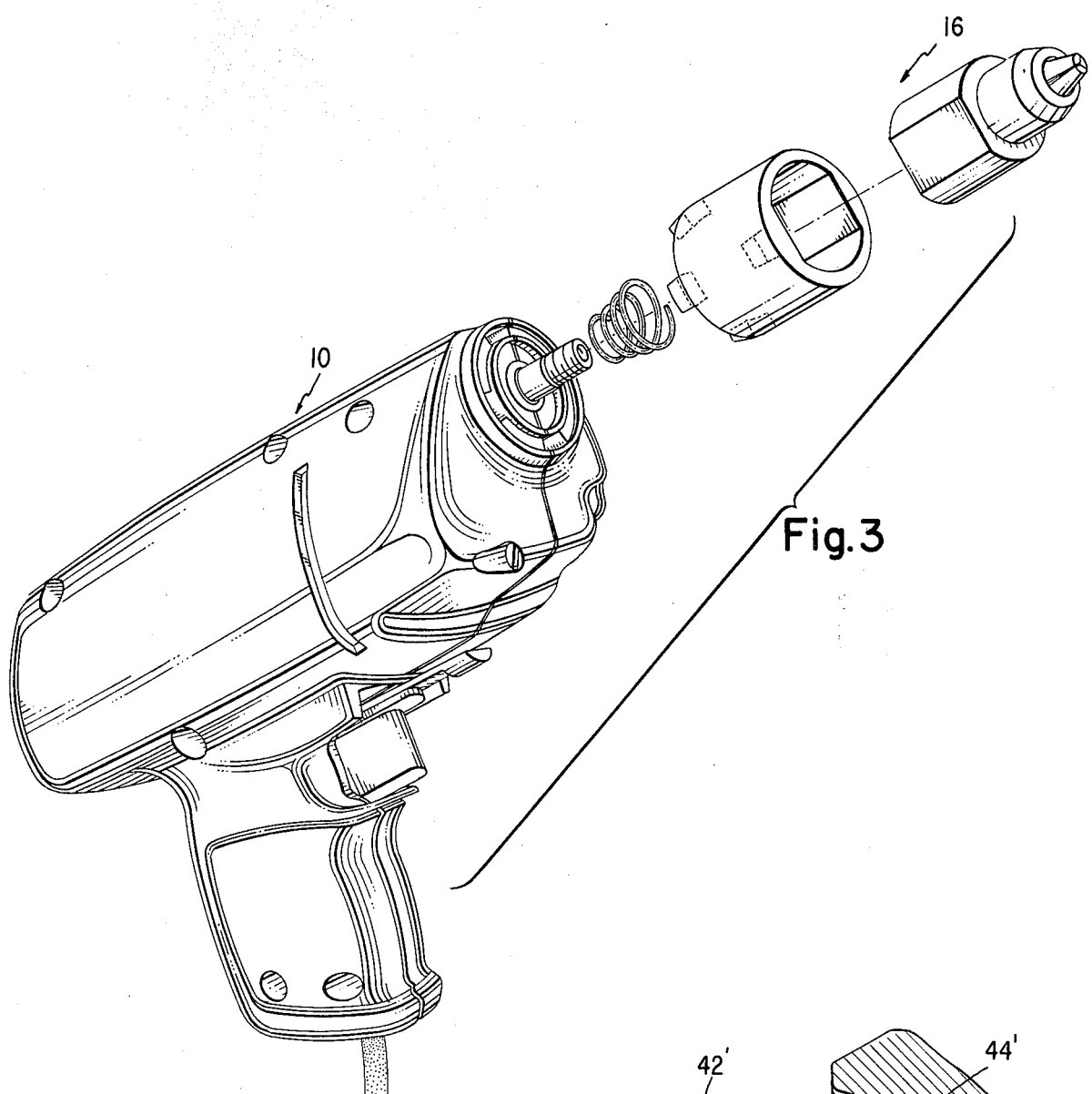
FIG. 3 is an exploded perspective illustration similar to FIG. 1 illustrating another embodiment of a drill and drill chuck in accordance with the present invention.

With reference now to the drawing, and particularly to FIGS. 1 and 2 thereof, there is shown and illustrated a portable electric drill designated generally by the reference character 10 having a threaded spindle 12 projecting outwardly from the nose portion of a housing 14 together with a keyless sliding jaw chuck designated generally by the reference character 16 associated with the drill 10 for powered actuation thereby for chucking and unchucking drill bits and other accessories in accordance with the present invention.

The drill chuck 16 comprises a generally cylindrical chuck body 18 having at its rearward end (i.e., to the left in FIG. 1) a threaded recess 20 adapted to receive the drill spindle 12. At its forward end (i.e., to the right in FIG. 1), the chuck body 18 has an axial bore 22 adapted for the reception of a working implement such as a drill bit, or other attachment. Extending rearwardly and outwardly from the axial bore 22 are three inclined bores 26, each bore being adapted for the reception of a jaw 28 slidably mounted for reciprocation therein. Surrounding the chuck body 18 is a sleeve or collar 30. Fixed within the sleeve or collar 30 is a traverse nut 32, the inner surface of which is provided with threads 34 for engaging complimentary thread segments 36 on each of the jaws 28. The traverse nut 32 may, in accordance with well known practice, be machined, and then split into two complementary halves 32a and 32b and assembled on the chuck body 18 to be held in position thereon by the sleeve or collar 30 and to be rotatable relative the chuck body 18 within a circumferential groove defined by spaced apart generally parallel annular walls 38 and 40.

The sleeve or collar 30 may be a press fit on the split halves of the traverse nut 32 so as to be fixed for rotation therewith. The outer surface of the traverse nut 32 and the inner surface of the sleeve of collar 30 may further be provided with complimentary flatted surfaces 31 and 33, respectively so as to yet further preclude any relative rotational motion therebetween. Hence, the sleeve or collar 30 and traverse nut 32 are rotatable as a unit on the body 18 but are held against relative axial movement by the walls 38 and 40 with the result that when the sleeve or collar 30 and traverse nut 32 assembly is turned the jaws 28 move in unison lengthwise of the inclined bore 26 to engage or disengage the drill bit or other attachment inserted therebetween.

A shell 42 is also rotatably carried surrounding the chuck body 18 and slidable on the sleeve or collar 30 being keyed thereto against relative rotation by mating flatted surfaces 35 and 37 on the interior of the shell 42 and exterior of the sleeve or collar 30, respectively. Spring means, such as a split detent ring 44 is carried in a channel 46 on the interior of the shell 42 adjacent the rearward end, that is, the end opposite the collar or sleeve 30 and the chuck body 18 is provided with mating detent grooves 48 and 50 separated by a raised crest 52. Accordingly, a forward or normal operating position and a rearward position are defined for the shell 42 and in normal operation of the drill the spring means or detent ring 44 is effective to retain the shell 42 in its forward position while permitting an operator to manually move it to its rearward position.

The rearward end portion of the shell 42 is provided with latching means such as a plurality of rearwardly extending teeth or lugs 54 for engaging mating means on the drill 10, such as a ring 56 mounted with the housing 14 annularly surrounding the spindle 12 and provided with such mating means such as teeth or lugs 58 which, when engaged with the teeth or lugs 54 when the shell 42 is manually moved to the rearward position prevent rotation of the shell 42 relative the drill 14. As heretofore pointed out, the mating flatted surfaces on the shell 42, sleeve or collar 30 and traverse nut 32 prevent relative rotation therebetween so that the traverse nut 32 is thereby held stationary relative the drill 10. If the drill 10 is then energized, the spindle 12 will tend to rotate relative the traverse nut 32 and if the jaws 28 are not restrained by either chucking engagement with a drill bit or other accessory or in full outward expansion against an annular stop wall 60 on the chuck body 18, the jaws 28 will be thereby moved within the slideways 26. The drill 10 is preferably reversible. Hence, when the drill is operated in a forward direction, the jaws 28 will be moved forwardly and inwardly on the slideways 26 for automatically chucking a drill or other accessory therebetween. When the drill 10 is operated in a reverse direction, rotating the spindle 12 in a counterclockwise direction, the jaws 28 will be slid rearwardly and outwardly in the slideways 26 for unchucking. The ring 56 may, as shown, be mounted with the drill 10 within an annular recess 62 of sufficient depth to shield the lugs or teeth 54 from accidental engagement by the operator's hands. The ring 56 may be mounted within the recess 62 in any convenient manner such as by means of roll pins 63, or the like, or the ring may be provided with an irregular or knurled periphery, for example, and be pressed or cast in place. To retain the chuck body 18 on the spindle 12, a left-handed locking screw 64 may be provided.

In use, if it is desired to chuck or unchuck a drill bit or other accessory, the operator need merely slide the shell 42 to its rearward position, positioning the detent ring 44 in the rearward groove 50, and then operate the drill 10 in the forward or reverse direction, as desired to chuck or unchuck, respectively, the drill bit or accessory. When the jaws are tight, the drill will stall and the shell 42 may then be slid forwardly, engaging the detent ring 44 in the forward groove 48 to enable normal operation of the drill. Movement of the shell 42 from the rearward or locked position to the forward, unlocked or operating position may be left to the manual selection of the operator. Preferably, however, means are provided for automatically releasing the shell 42 from its locked position at a preselected torque level sufficient to securely chuck a drill bit or accessory yet below the stall torque of the drill motor so as to both protect the motor from excessive operation in a stalled position and to make use of the tool by an operator more convenient.

Such automatic operation may be readily achieved by angulating the sides of the teeth or lugs 54 and/or the teeth or lugs 58. Both may be so angulated and/or the angulated surfaces which contact in the reverse or unchucking direction may be slightly steeper than the angulated surfaces which contact in the forward or chucking direction so that sufficient torque should always be available to unchuck any drill bit or accessory that has been chucked. In use, the angulation is sufficient to drive the shell 42 forwardly when the preselected torque level has been reached and sufficient to raise the detent ring 44 over the crest 52 so that it may snap into the groove 48 and pull the lugs or teeth 54 well clear of the lugs or teeth 58 and permit normal drilling operations, the detent ring being effective to function as a spring to hold the shell 42 in the forward or operative position and precluding inadvertant rearward movement thereof.

Figure 4:
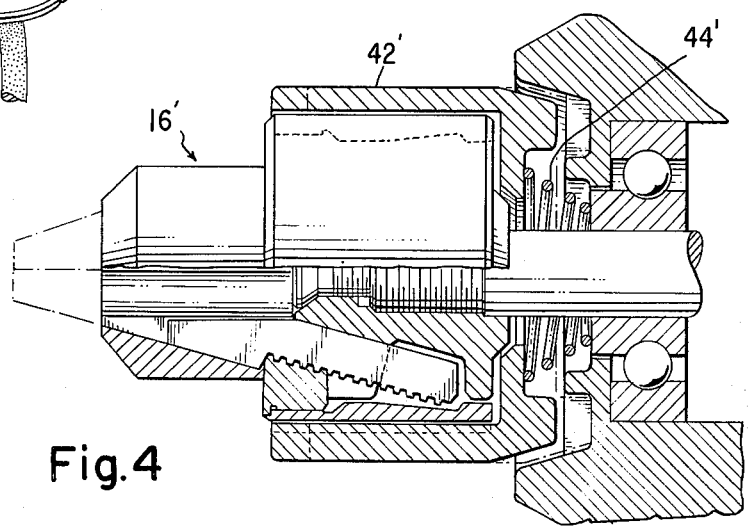
FIG. 4 is an elevational cross-sectional view similar to FIG. 2 of the nose portion and drill chuck of FIG. 3.

Referring now to FIGS. 3 and 4, there is shown and illustrated another embodiment or modification of a drill and keyless sliding jaw drill chuck in accordance with the present invention and wherein identical reference characters are utilized for parts that are the same as like parts in the previous embodiment or modification. Like reference characters are also used for similar parts, serving similar functions yet differing in specific detail, except that in such instance the like reference numbers are primed. Hence, the drill 10 is shown and illustrated with a modified keyless sliding jaw chuck 16'. In the drill chuck 16', the primary substitutive difference is that the spring means for holding the shell 42' in its forward, operative position comprises a conically wound compression spring 44' positioned behind the shell 42' so that the shell 42' is biased forwardly into the normal operating position thereof. In this embodiment or modification, the operator would depress the shell 42' against the compression spring 44' to engage the lugs and hold the spring 44' compressed for chucking and unchucking.

Figures 5, 6:
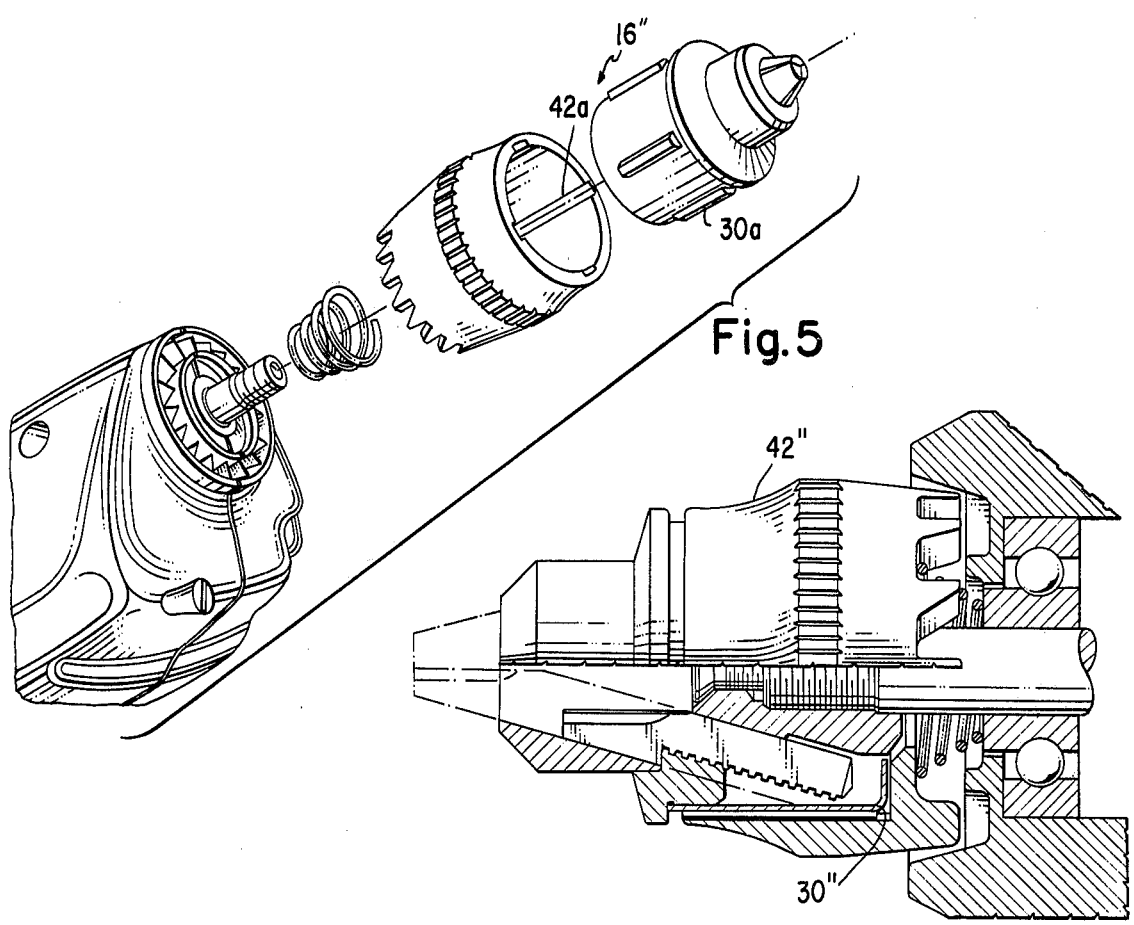
FIG. 5 is an exploded perspective illustration of yet another embodiment of drill and drill chuck in accordance with the present invention.
FIG. 6 is an enlarged cross-sectional illustration of the nose portion of the drill and drill chuck of FIG. 5.

Referring now to FIGS. 5 and 6, there is shown and illustrated yet another drill and keyless sliding jaw drill chuck constructed in accordance with the principles of the present invention wherein, as in the description of FIGS. 3 and 4, like reference characters are utilized for identical parts as well as for similar parts but wherein for parts that are similar yet not identical, the reference characters are double primed. In the chuck 16" of FIGS. 5 and 6, the keying means between the shell 42" and the sleeve or collar 30" comprises slots 42a formed on the interior of the shell 42" and mating longitudinally extending protuberances 30a extending radially outwardly of the sleeve or collar 30". Further, the sleeve or collar 30" may be of pressed steel construction, with the protuberances 30a being formed or pressed in the wall thereof.

While the invention has been described, disclosed, illustrated and shown in terms of certain embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and spirit of the claims hereto appended.

I claim:

1. Powered drill comprising a housing and including a keyless slidable jaw chuck having a plurality of slidable jaws provided with externally extending teeth mounted within a chuck body having mating angularly spaced slideways for said jaws extending forwardly and inwardly in said chuck body and a traverse nut rotatable on said chuck body having internal threads engaged with said jaws together with a locking shell slidable relative the traverse nut so as to rotate together therewith relative the chuck body, at least one and preferably a plurality of lugs or teeth extending around an annular end of said locking shell adjacent said drill housing and at least one and preferably a plurality of mating lugs or teeth provided on said drill housing adjacent said locking shell, wherein said lugs or teeth are angulated to provide a vector force during torquing which acts in a direction forwardly of the chuck tending to release said lugs or teeth of said sliding shell from their toothed engagement with said drill housing so that, when said shell is slid rearwardly towards said drill, said shell and traverse nut are held against rotation relative said drill and upon actuation of the drill to rotate said chuck body, said jaws will be automatically extended or retracted, depending upon the drill rotation direction, to chuck or unchuck a drill bit or other accessory inserted therebetween, and spring means for retaining said sliding shell in its forward, released or unlocked position to enable normal operative rotation of said chuck while requiring positive operator applied rearward pressure thereon for engaging said locking means, said spring means further comprising a spring detent for selectively holding said shell in either a forward position wherein said teeth are disengaged for drilling, or the like, and in a rearward position wherein said teeth are engaged for chucking and unchucking so that the inclination of said teeth pops said detent from said rear position to said forward position at a predetermined torque.

2. Powered drill defined in claim 1 wherein said spring means comprises a conical compression spring behind said shell, said spring biasing said shell towards the forward configuration wherein said teeth are disengaged.

3. Keyless slidable jaw chuck comprising a plurality of slidable jaws provided with externally extending teeth mounted with a chuck body having mating angularly spaced slideways for said jaws extending forwardly and inwardly in said chuck body, a traverse nut rotatable on said chuck body having internal threads engaged with said jaws and a locking shell slidable relative the traverse nut so as to rotate together therewith relative the chuck body including locking means on the rearward annular face of said shell, at least one and preferably a plurality of lugs or teeth extending around an annular end of said shell adjacent the drill for mating cooperation with mating locking means on a drill housing, said lugs or teeth being angulated to provide a vector force during torquing which acts in a direction forwardly of the chuck tending to release said lugs or teeth of said sliding shell from their toothed engagement with the mating locking means on said drill housing, so that, when said shell is slid rearwardly towards said drill housing, said shell and traverse nut are held against rotation relative said drill housing whereby upon actuation of the drill to rotate said chuck body, said jaws will be automatically extended or retracted, depending upon the drill rotation direction, to chuck or unchuck a drill bit or other accessory inserted therebetween, and spring means for retaining said sliding shell in its forward, released or unlocked position to enable normal operation of said chuck while requiring positive operator applied rearward pressure thereon for engaging said locking means, said spring means further comprising a spring detent for selectively holding said shell in either a forward position wherein said teeth are disengaged for drilling, or the like, and in a rearward position wherein said teeth are engaged for chucking and unchucking so that the inclination of said teeth pops said detent from said rear position to said forward position at a predetermined torque.

* * * * *